Feb. 12, 1957     H. HOWARD     2,781,074
LOAD DISTRIBUTING INSERT FOR PNEUMATIC TIRES
Filed Jan. 8, 1954     2 Sheets-Sheet 1
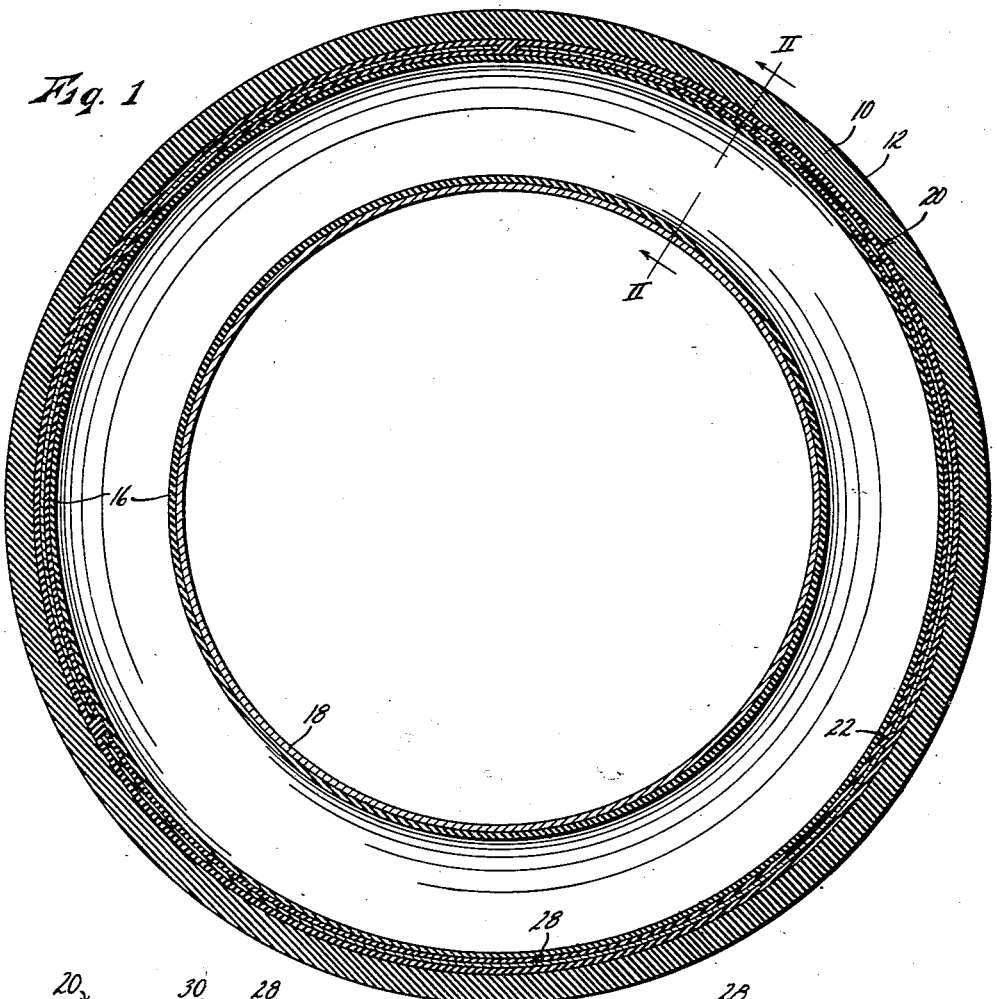
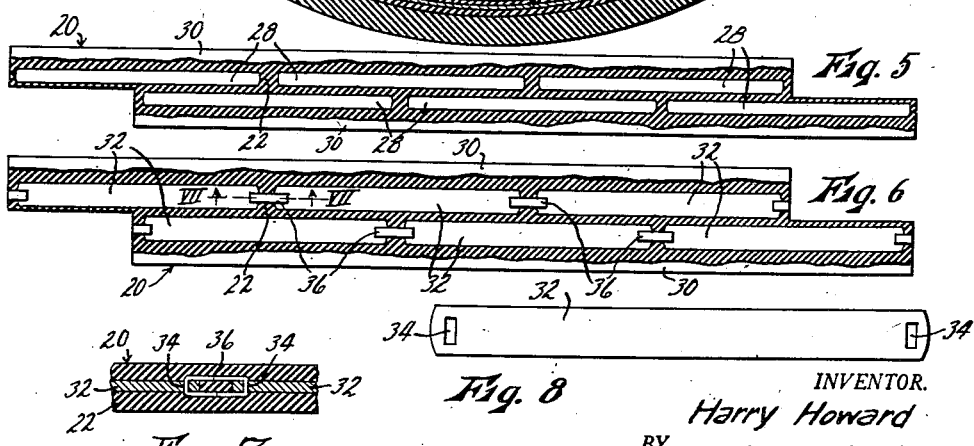
INVENTOR.
Harry Howard
BY
Hamilton & Hamilton
Attorneys.

Feb. 12, 1957 H. HOWARD 2,781,074
LOAD DISTRIBUTING INSERT FOR PNEUMATIC TIRES
Filed Jan. 8, 1954 2 Sheets-Sheet 2
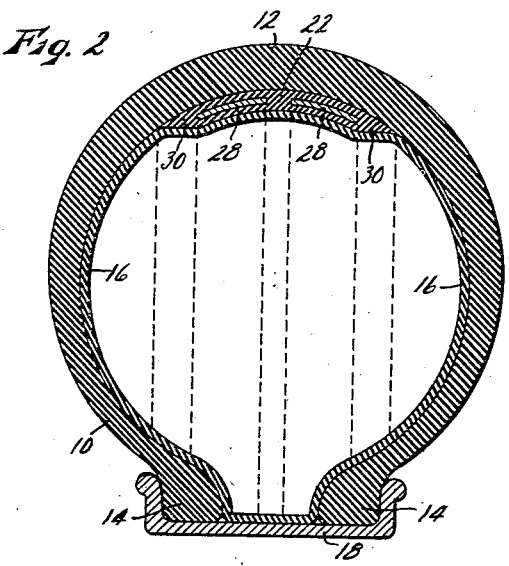
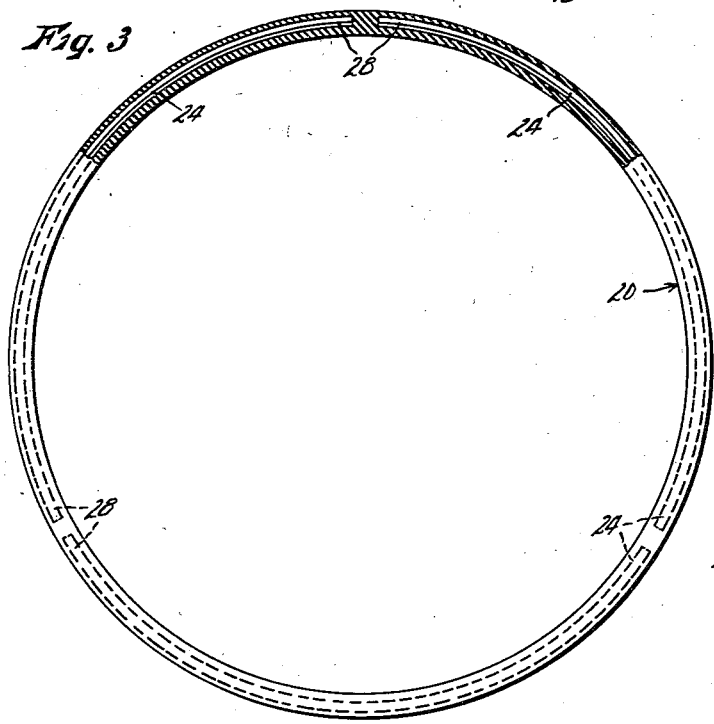
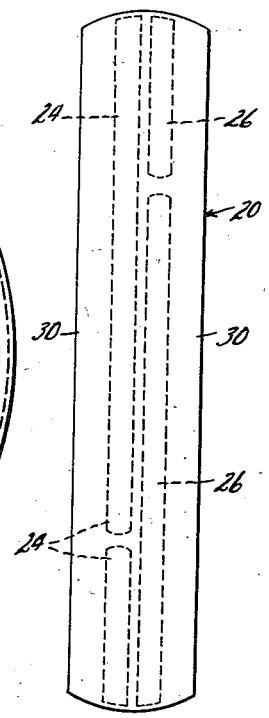
INVENTOR.
Harry Howard
BY
Hamilton & Hamilton
Attorneys.

United States Patent Office 2,781,074
Patented Feb. 12, 1957

2,781,074

LOAD DISTRIBUTING INSERT FOR PNEUMATIC TIRES

Harry Howard, Kansas City, Mo.

Application January 8, 1954, Serial No. 402,855

2 Claims. (Cl. 152—204)

This invention relates to improvements in load distributing insert for pneumatic tires and more particularly to a load distributing insert to be positioned within the tire casing and to encircle entirely the inflatable inner tube.

The principal object of the present invention is the provision of a tire casing in which is mounted an inflatable inner tube with a load distributing insert of resilient material disposed therebetween along the tread line of said tire whereby the load on the wheel will be distributed along a much larger area of the inner tube thus making it possible to greatly reduce the pressure in the tube to carry the load delivered to the wheel.

Other objects are simplicity and economy of construction, ease and efficiency of operation and adaptability for use with the various types of pneumatic tires.

With these objects in view as well as other objects which will appear during the course of the specification, reference will be had to the drawings wherein, Fig. 1 is a sectional view of the pneumatic tire;

Fig. 2 is an enlarged sectional view taken on line II—II of Fig. 1;

Fig. 3 is a reduced side elevational view of the load distributing insert with parts in section;

Fig. 4 is an edge view of the insert shown in Fig. 3;

Fig. 5 is a stretchout view of the load distributing sheath partly in section;

Fig. 6 is a stretchout view of a modified form of the load distributing insert partly in section;

Fig. 7 is an enlarged sectional view taken on line VII—VII of Fig. 6, and

Fig. 8 is an enlarged elevational view of one of the resilient strips shown in Fig. 6.

Throughout the several views of the drawings, like numerals refer to similar parts and the numeral 10 designates a pneumatic tire casing of the regular type having a thickened tread portion 12 and rim engaging portions 14. Mounted in tire 10 is a standard inflatable inner tube 16 which is adapted to be inflated to any desired degree of pressure to properly support the load that is to be carried. A wheel rim 18 is shown in Figs. 1 and 2. As shown in Fig. 1, the load distributing insert 20 comprises an elastic sheath or ring members 22 adapted to snugly fit into the inner wall of tire casing 10 along the thickened tread portions 12. This sheath is reinforced by two rings 24 and 26 of like resilient bars 28 which are embedded therein in spaced apart circumferential relation and are transversely spaced apart with their joints circumferentially offset so that the load on the inflated inner tube will be substantially equal at all times during the full revolution of the wheel, see Figs. 3 and 5.

To more smoothly fit the insert to the assembled tire parts, it will be noted that the sheath 20 is feathered off at its opposite edges at 30 to eliminate undesirable offsets.

Due to the fact that the sheath 20 is arcuate in cross section and the reinforcing rings 24 and 26 are on opposite sides of the medial line of the tire, the insert will tend to hold its central position at all times.

Due to the fact that the bars 28 are embedded in an elastic material they are free to move closer together or farther apart as the case may be during the rotation of the wheel.

The modified form of insert shown in Figs. 6, 7 and 8 is somewhat similar to that shown in the preferred form except that the resilient bars 32 are provided at their opposite ends with transverse elongated slots 34 which are adapted to receive pliable straps 36 therethrough to hold the parts against objectional relative movement. Furthermore, these resilient bars are held in proper circular alignment.

It is quite evident that I have shown and described an insert for pneumatic tires wherein a sheath of suitable elastic material which is adapted to receive and position spaced apart resilient bars which serve to distribute the load applied to the wheel to a relative large area of the inflated inner tube. This structure is especially desirable where the load per wheel is extremely high, as is the case of trucks. The ordinary pneumatic tires having the usual casing and inner tube transmits the wheel load of about twenty times the pressure of the air in the inner tube due to limited area of the casing deformed to transmit a pressure directly to the inner tube. With the present insert in position as described, the load transmitted to the inner tube due to resilient bars of the insert which serve to transmit the wheel load to a relatively large arcuate angle of the periphery of the inner tube at all time during a full revolution of the tire. It will be apparent that the load carrying capacity of the inner tube at a given inflation will be greatly increased by use of the load distributing insert.

Each of the rings 24 and 26 comprise a series of three resilient members of substantially 120° each and the joints of each set of resilient members are arranged in offset relation of about 60° about the entire circle whereby the wheel load is transmitted further about the inner tube by the overlapping resilient members.

What I claim is:

1. For use with a pneumatic tire having a casing provided with an inflatable inner tube, a load distributing insert, mounted in the casing and positioned about the periphery of said inner tube, said insert comprising a sheath carrying two sets of spaced apart resilient bars of substantially equal lengths, the bars of each set being positioned in spaced apart end to end ring relation, said sets being transversely spaced apart, and the bars of the sets being circumferentially offset to break the joints therebetween, each of said bars having a length subtending an angular arc greater than that subtended by the area of contact of said tire with a roadway.

2. In combination with a pneumatic automobile tire having a casing provided with an inflatable inner tube, a resilient load distributing insert positioned within said casing and about the periphery of said inner tube, said insert comprising an elastic sheath carrying a plurality of series of resilient bars each series of bars being positioned in spaced apart end to end relation in ring form and being positioned in transversely spaced apart relation and the bars of each series being offset circumferentially to break the joints therebetween, each of said bars having a length subtending an angular arc greater than that subtended by the area of contact of said tire with a roadway.

References Cited in the file of this patent

UNITED STATES PATENTS

| 866,297 | Noyes | Sept. 17, 1907 |
| 1,267,848 | Carslaw | May 28, 1918 |

FOREIGN PATENTS

| 601,139 | France | July 22, 1925 |